US010821985B2

(12) United States Patent
Egashira et al.

(10) Patent No.: US 10,821,985 B2
(45) Date of Patent: Nov. 3, 2020

(54) GEAR CHANGE CONTROL DEVICE AND GEAR CHANGE CONTROL METHOD

(71) Applicant: Honda Motor Co.,Ltd., Tokyo (JP)

(72) Inventors: Fumio Egashira, Saitama (JP); Kazuma Sasahara, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 98 days.

(21) Appl. No.: 16/354,130

(22) Filed: Mar. 14, 2019

(65) Prior Publication Data

US 2019/0283759 A1     Sep. 19, 2019

(30) Foreign Application Priority Data

Mar. 15, 2018  (JP) .................................. 2018-048120
Dec. 14, 2018  (JP) .................................. 2018-234334

(51) Int. Cl.
*B60W 10/02* (2006.01)
*B60W 10/06* (2006.01)
(Continued)

(52) U.S. Cl.
CPC .......... *B60W 30/19* (2013.01); *B60W 10/026* (2013.01); *B60W 10/06* (2013.01);
(Continued)

(58) Field of Classification Search
CPC .... B60W 30/19; B60W 10/026; B60W 10/06; B60W 10/115; B60W 2510/0233;
(Continued)

(56) References Cited

U.S. PATENT DOCUMENTS 4,914,982 A * 4/1990 Ito ........................... F16H 61/12
                                                                  477/125
6,645,121 B2 * 11/2003 Wu ......................... F16H 59/72
                                                                  477/98
(Continued)

FOREIGN PATENT DOCUMENTS

CN       101922553      12/2010
CN       103661382       3/2014
(Continued)

OTHER PUBLICATIONS

Office Action of Japan Counterpart Application, with English translation thereof, dated Jul. 14, 2020, pp. 1-6.
(Continued)

*Primary Examiner* — Tinh Dang
(74) *Attorney, Agent, or Firm* — JCIPRNET

(57) ABSTRACT

A gear change control device and method thereof are provided. The gear change control device is a target torque control device that sets a target torque of a motor outputting a torque to a multilevel transmission having a torque converter and a lockup clutch. In a case when the lockup clutch is in a fastened state and during upshifting gear change, target torque reduction control is executed for reducing the target torque of the motor such that the output of the motor becomes a torque at which a heat generation temperature of the lockup clutch does not exceed an allowable temperature. If the lockup clutch is fastened, threshold value changing control is executed for changing threshold value of a rotation speed of the motor or the input shaft when the gear range is shifted to the side of higher range during upshifting gear change to a higher rotation speed.

5 Claims, 7 Drawing Sheets

(51) Int. Cl.
*B60W 30/19* (2012.01)
*B60W 10/115* (2012.01)
*F16H 3/66* (2006.01)

(52) U.S. Cl.
CPC ... *B60W 10/115* (2013.01); *B60W 2510/0233* (2013.01); *B60W 2510/0291* (2013.01); *B60W 2510/1005* (2013.01); *B60W 2710/0644* (2013.01); *B60W 2710/0666* (2013.01); *B60W 2710/1011* (2013.01); *F16H 3/66* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01)

(58) Field of Classification Search
CPC . B60W 2510/0291; B60W 2510/1005; B60W 2710/0644; B60W 2710/0666; B60W 2710/1011; B60W 2710/1072; F16H 3/66; F16H 2200/0069; F16H 2200/2012; F16H 2200/2046; F16H 2200/2066; F16H 2200/2082
See application file for complete search history.

(56) References Cited

U.S. PATENT DOCUMENTS 8,296,028 B2 * 10/2012 Matsunaga .......... F16H 61/143
 701/67
8,315,767 B2 * 11/2012 Sawada ................ B60W 10/11
 701/52
8,483,920 B2 * 7/2013 Watanabe ............... F16H 61/16
 701/68

FOREIGN PATENT DOCUMENTS

| | | |
|---|---|---|
| JP | 2008157190 | 7/2008 |
| JP | 2009108955 | 5/2009 |
| JP | 2010159722 | 7/2010 |
| JP | 4867725 | 2/2012 |
| JP | 2017172630 | 9/2017 |

OTHER PUBLICATIONS

"Office Action of China Counterpart Application", with English translation thereof, dated May 18, 2020, p. 1-p. 15.

* cited by examiner

|  | C1 | C2 | C3 | B1 | B2 | B3 | F1 | gear ratio | common ratio |
|---|---|---|---|---|---|---|---|---|---|
| Rvs |  |  | ○ |  | ○ |  | L | 4.008 |  |
| 1st |  |  |  | ○ | (○) |  | R/L | 5.233 | 1.554 |
| 2nd |  | ○ |  | ○ | ○ |  | R | 3.367 | 1.465 |
| 3rd |  |  | ○ | ○ | ○ |  | R | 2.298 | 1.348 |
| 4th |  | ○ | ○ | ○ |  |  | R | 1.705 | 1.251 |
| 5th | ○ |  | (○) | ○ |  |  | R | 1.363 | 1.363 |
| 6th | ○ | ○ | ○ |  |  |  | R | 1.000 | 1.273 |
| 7th | ○ |  | ○ |  | ○ |  | R | 0.786 | 1.196 |
| 8th | ○ | ○ |  |  | ○ |  | R | 0.657 | 1.126 |
| 9th | ○ |  |  |  | ○ | ○ | R | 0.584 | 1.120 |
| 10th | ○ | ○ |  |  |  | ○ | R | 0.520 |  |

FIG. 4

GEAR CHANGE CONTROL DEVICE AND GEAR CHANGE CONTROL METHOD

CROSS-REFERENCE TO RELATED APPLICATION

This application claims the priorities of Japan patent application serial no. 2018-048120, filed on Mar. 15, 2018 and Japan patent application serial no. 2018-234334, filed on Dec. 14, 2018. The entirety of the above-mentioned patent applications are hereby incorporated by reference herein and made a part of this specification.

BACKGROUND

Technical Field

The disclosure relates to a gear change control device and a gear change control method for setting a target torque of a motor that outputs a torque to a multilevel transmission that has a torque converter and a lockup clutch.

Description of Related Art

In the related art, a multilevel transmission that has a torque converter and a lockup clutch and a motor that outputs a torque to the multilevel transmission are known (see Patent Document 1, for example). According to Patent Document 1 (Japanese Patent No. 4867725), a damper that has two types of springs with different spring constants is provided, and in a case in which the lockup clutch is in a fastened state, a torque output by the motor is reduced to be less than a predetermined torque to reduce vibration, wherein the predetermined torque is a torque for changing the spring constants of the damper.

In recent years, outputs of motors have increased, and a range in which an allowable temperature of the lockup clutch is exceeded if the lockup clutch is fastened has increased. In a case in which it is assumed that the lockup clutch exceeds the allowable temperature, it is not possible to fasten the lockup clutch, and the lockup clutch remains released. However, this may lead to degradation of acceleration performance.

However, it has been discovered that if the target toque is reduced when the lockup clutch is fastened, the maximum rotation speed of the motor in a stage before the upshifting is completed decreases.

SUMMARY

An aspect of the disclosure provides a gear change control device (for example, a gear change control device in an embodiment; the same applies below) that controls a multilevel transmission (for example, a multilevel transmission in the embodiment; the same applies below) that has an input shaft, a torque converter (for example, a torque converter in the embodiment; the same applies below), and a lockup clutch (for example, a lockup clutch in the embodiment; the same applies below) and requests a target torque of a motor that outputs a torque to the multilevel transmission, in which the lockup clutch is configured to be switchable between a released state and a fastened state. The released state is a state in which an output torque of the motor is delivered to the multilevel transmission via the torque converter. The fastened state is a state in which the output torque of the motor is delivered directly to the multilevel transmission without the torque converter interposed therebetween. In a case in which the lockup clutch is in the fastened state, target torque reduction control is executed for providing a request to the motor for reducing the target torque of the motor such that the output torque of the motor becomes an output torque at which a heat generation temperature of the lockup clutch does not exceed an allowable temperature, during upshifting gear change. If the lockup clutch is fastened, threshold value changing control is executed for changing a threshold value of a rotation speed of the motor or a threshold value of a rotation speed of the input shaft of the multilevel transmission when a gear range is shifted to a higher gear range during the upshifting gear change to a side of higher rotation speed.

According to one or some exemplary embodiments of the disclosure, the target torque reduction control may be executed in a torque phase during the upshifting gear change and may not be executed in an inertia phase.

Also, one or some exemplary embodiments of the disclosure, the target torque reduction control may be executed in a case in which it is assumed that the lockup clutch exceeds the allowable temperature when the lockup clutch is fastened.

Also, another embodiment of the disclosure provides a gear change control method of controlling a multilevel transmission that has an input shaft, a torque converter, and a lockup clutch and requesting a target torque of a motor that outputs a torque to the multilevel transmission. The lockup clutch is configured to be switchable between a released state and a fastened state. The released state is a state in which an output torque of the motor is delivered to the multilevel transmission via the torque converter. The fastened state is a state in which the output torque of the motor is delivered directly to the multilevel transmission without the torque converter interposed therebetween. The gear change control method includes, in a case in which the lockup clutch is in the fastened state: executing target torque reduction control for providing a request to the motor for reducing the target torque of the motor such that the output torque of the motor becomes an output torque at which a heat generation temperature of the lockup clutch does not exceed an allowable temperature, during upshifting gear change; and executing, if the lockup clutch is fastened, threshold value changing control for changing a threshold value of a rotation speed of the motor or a threshold value of a rotation speed of the input shaft of the multilevel transmission when a gear range is shifted to a higher gear range during the upshifting gear change to a side of higher rotation speed.

BRIEF DESCRIPTION OF THE DRAWINGS

FIG. 4 is an explanatory diagram illustrating an engaged state of each engagement mechanism in each gear range according to the embodiment.

DESCRIPTION OF THE EMBODIMENTS

Figure 1:
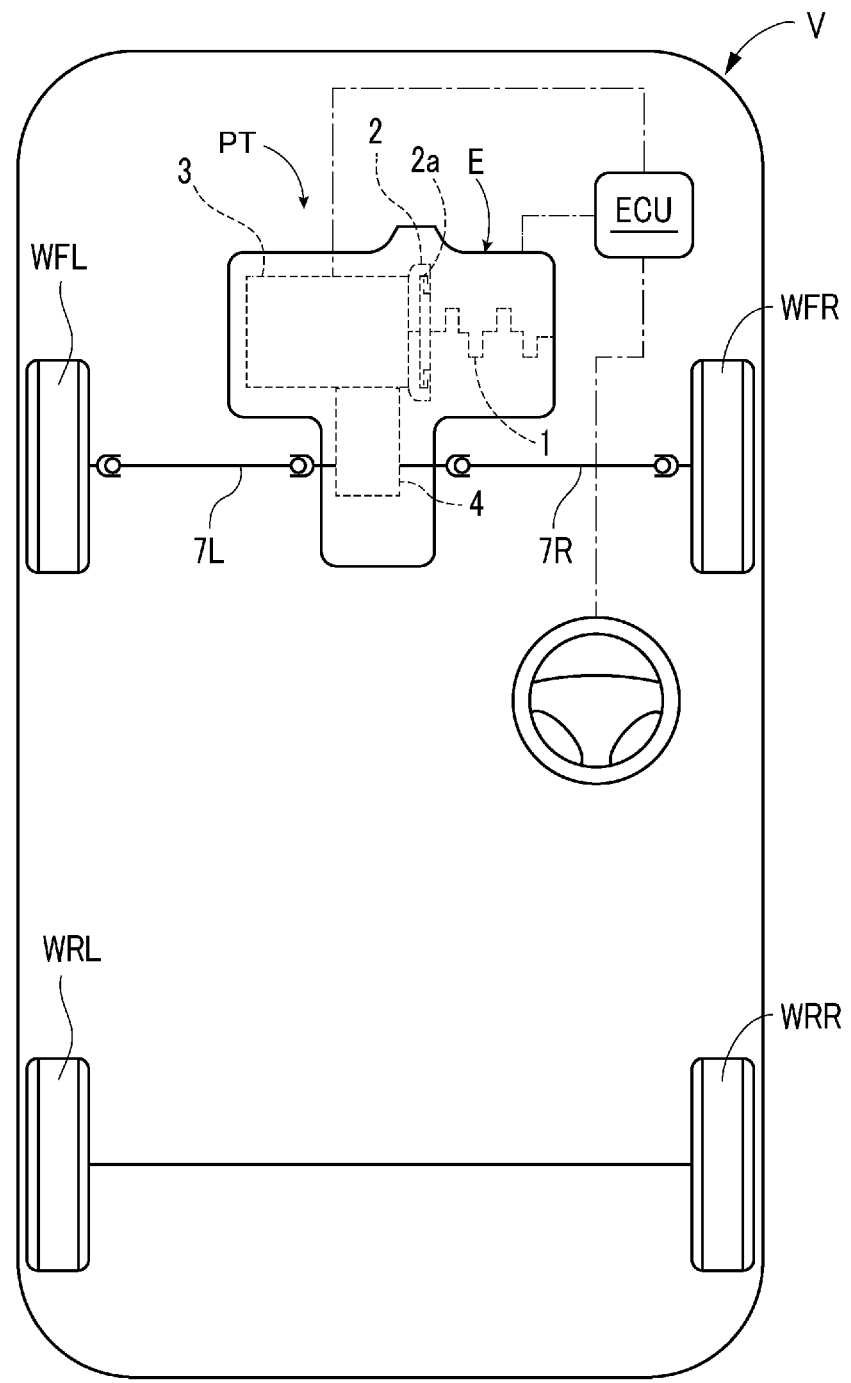
FIG. 1 is an explanatory diagram schematically illustrating a vehicle in which a multilevel transmission that includes a gear change control device according to an embodiment is mounted.

The applicant has applied a target torque control device that reduces a target torque during upshifting such that it is possible to maintain the lockup clutch (LC) within the allowable temperature range even if the lockup clutch is fastened.

The disclosure provides a gear change control device and a gear change control method capable of curbing a decrease in the maximum rotation speed even if the target torque is reduced during the upshifting when the lockup clutch is fastened.

According to one or some exemplary embodiments of the disclosure, if the lockup clutch is fastened, the threshold value of the rotation speed of the motor or the multilevel transmission when the gear range is shifted to the side of the high gear range at the time of the upshifting is changed through the threshold value changing control. In this manner, it is possible to curb a decrease in the maximum rotation speed of the motor in a stage before the upshifting is completed even if the target torque is reduced during the upshifting when the lockup clutch is fastened.

According to one embodiments of the disclosure, it is possible to quickly reduce the rotation speed of the motor to a rotation speed corresponding to the gear range after the upshifting in the inertia phase.

According to one embodiments of the disclosure, it is possible to execute the target torque reduction control by determining whether or not the lockup clutch exceeds the allowable temperature and thereby to further improve acceleration performance as compared with a case in which the target torque reduction control is executed in the same way when the lockup clutch is fastened.

According to one or some exemplary embodiments of the disclosure, if the lockup clutch is fastened, the threshold value of the rotation speed of the motor or the multilevel transmission when the gear range is shifted to the side of the high gear range at the time of the upshifting is changed to the side of the high rotation speed through the threshold value changing control. In this manner, it is possible to curb a decrease in the maximum rotation speed of the motor in the stage before the upshifting is completed even if the target torque is reduced during the upshifting when the lockup clutch is fastened.

Referring to the drawings, a multilevel transmission, which includes a gear change control device according to an embodiment, or to which a gear change control method is applied, and a vehicle in which the multilevel transmission is mounted will be described.

As illustrated in FIG. 1, a vehicle V in which the multilevel transmission that includes the gear change control device according to the embodiment is mounted is adapted such that an engine E (an internal combustion engine or a drive source; a motor may be used instead of the engine E) is mounted in a vehicle body in a lateral orientation with a crankshaft 1 directed in the left-right direction of the vehicle. Drive force output from the engine E is delivered to a power transmission device PT. Then, the drive force of the engine E is adjusted by the power transmission device PT in accordance with a selected gear ratio and is then delivered to left and right front wheels WFL and WFR.

The power transmission device PT is configured of a multilevel transmission 3 that has a torque converter 2 connected to the crankshaft 1 and a front differential gear 4 that is connected to the multilevel transmission 3. The torque converter 2 includes a lockup clutch (LC) 2a for inputting rotation of the crankshaft 1 directly to an input shaft 11 of the multilevel transmission 3 without increasing the torque. The lockup clutch 2a is shifted between a fastened state and a released state, rotation of the crankshaft 1 is input directly to the input shaft 11 of the multilevel transmission 3 without increasing the torque in the fastened state, power transmission via the lockup clutch 2a is disconnected, and the torque is increased and then input to the multilevel transmission 3 in the released state.

The front differential gear 4 is connected to the left and right front wheels WFL and WFR via a front left vehicle shaft 7L and a front right vehicle shaft 7R.

Figure 2:
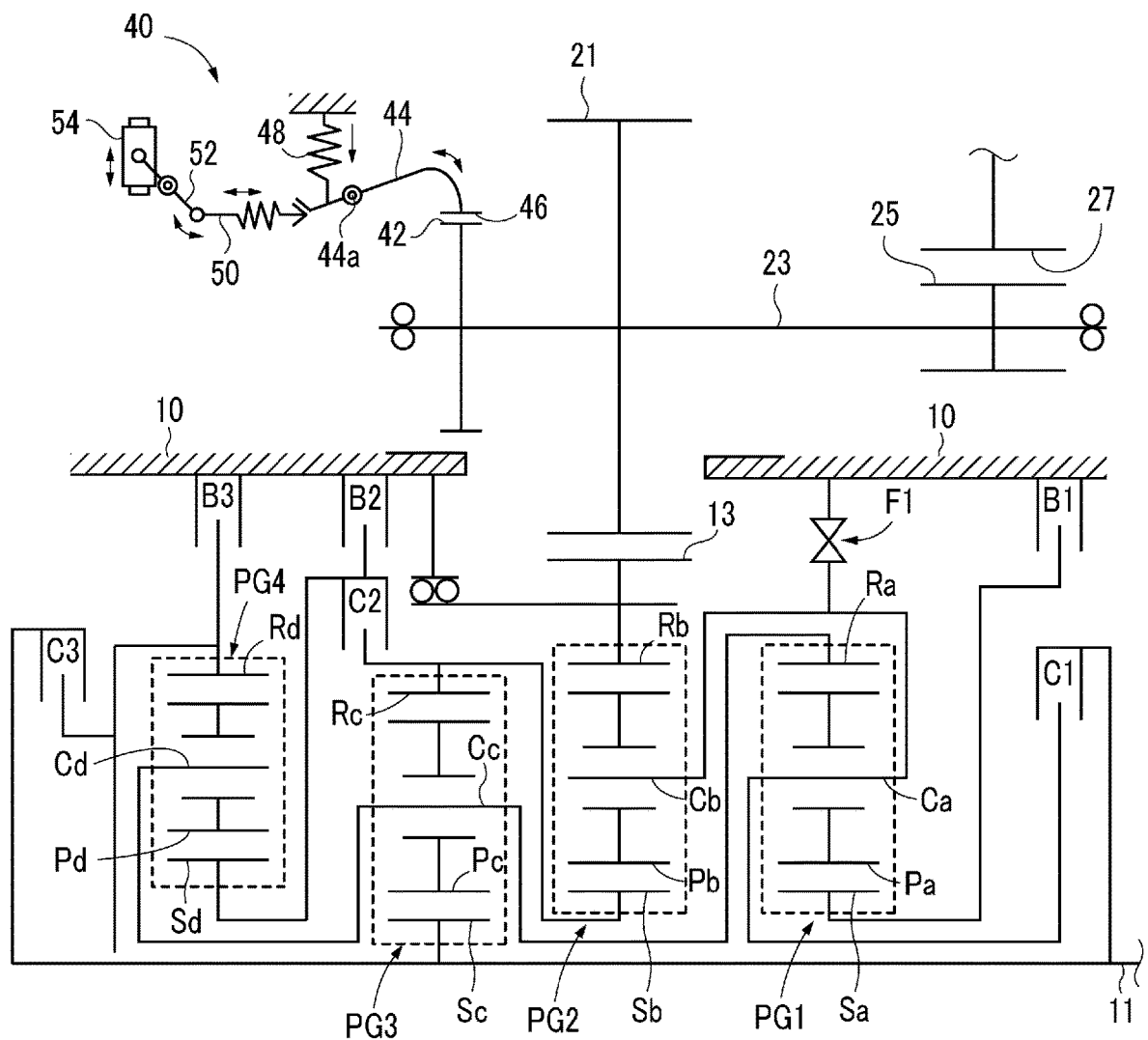
FIG. 2 is a skeleton view illustrating the multilevel transmission according to the embodiment.

FIG. 2 is a skeleton view illustrating portions of the multilevel transmission 3 other than the torque converter 2. The multilevel transmission 3 includes the input shaft 11, which is rotatably axially supported in a transmission case 10 that serves as a case body, to which drive force output by the engine E that serves as a motor is delivered via the torque converter 2 that has the lockup clutch and a damper and an output member 13 that serves as an output unit configured of an output gear disposed coaxially with the input shaft 11.

Rotation of the output member 13 is delivered to the left and right drive wheels (front wheels WFL and WFR) of the vehicle via an idle gear 21 that is meshed with the output member 13, an idle shaft 23 that axially supports the idle gear 21, a final drive gear 25 that is axially supported by the idle shaft 23, and a front differential gear 4 that includes a final driven gear 27 that is meshed with the final drive gear 25. In addition, a propeller shaft may be connected instead of the front differential gear 4, and this may be applied to a rear wheel drive vehicle. Also, the propeller shaft may be connected to the front differential gear 4 via a transfer, and this may be applied to a four-wheel drive vehicle.

Four first to fourth planetary gear mechanisms PG1 to PG4 are disposed in order from the side of the engine E coaxially with the input shaft 11 in the transmission case 10 that serves as a case body.

The first planetary gear mechanism PG1 is configured of a so-called single pinion-type planetary gear mechanism that includes a sun gear Sa, a ring gear Ra, and a carrier Ca that axially supports a pinion Pa that meshes the sun gear Sa and the ring gear R such that the pinion Pa freely rotates and revolves.

The so-called single pinion-type planetary gear mechanism is also referred to as a minus planetary gear mechanism or a negative planetary gear mechanism since the ring gear rotates in a direction different from that of the sun gear if the sun gear is caused to rotate while the carrier is secured. Note that the so-called single pinion-type planetary gear mechanism is adapted such that the carrier rotates in the direction that is same as that of the sun gear if the sun gear is caused to rotate while the ring gear is secured.

Figure 3:
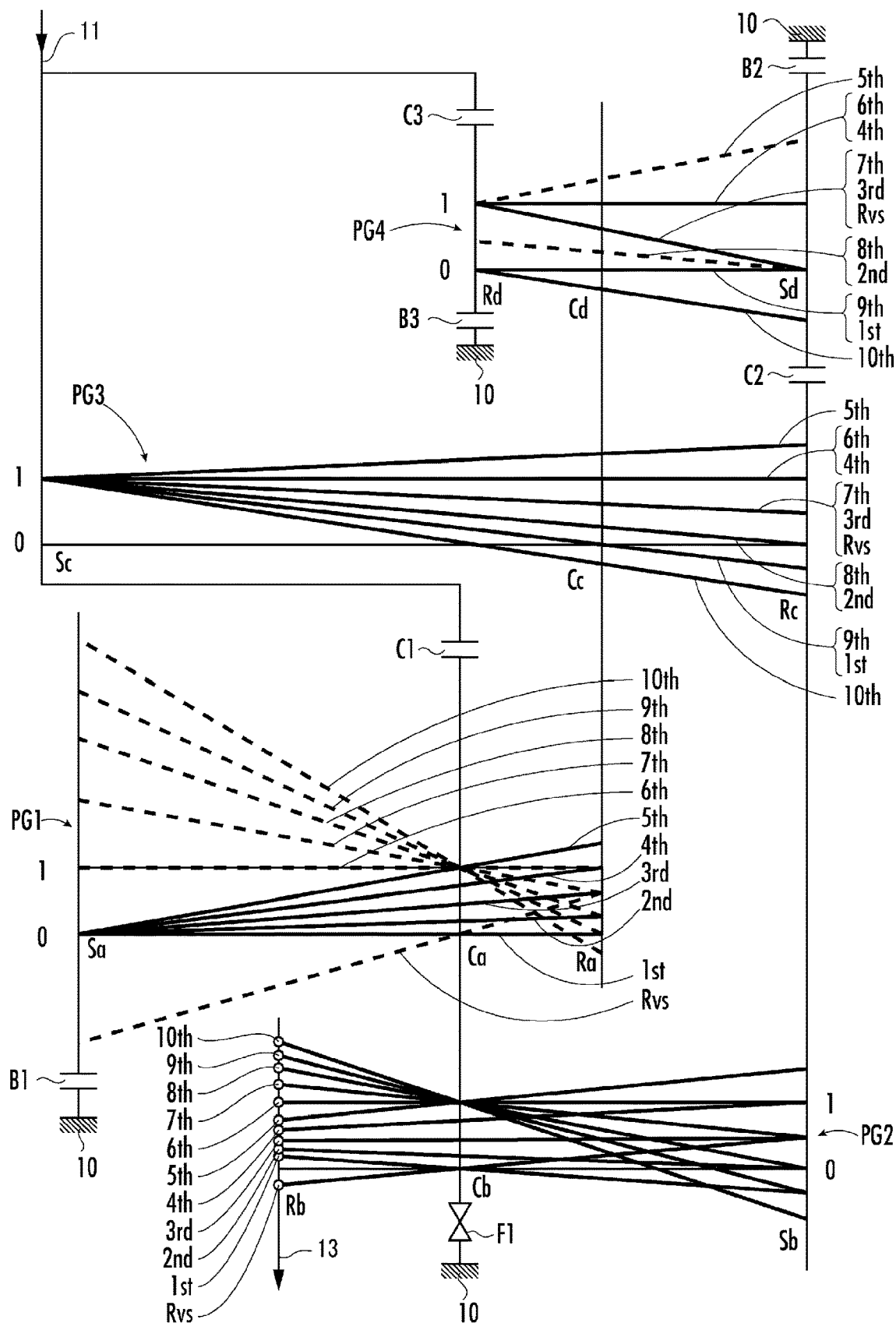
FIG. 3 is an alignment chart of a planetary gear mechanism according to the embodiment.

Referring to the alignment chart of the first planetary gear mechanism PG1 illustrated in the third level from the top in FIG. 3, the three elements Sa, Ca, and Ra of the first planetary gear mechanism PG1 are assumed to be a seventh element, an eighth element, and a ninth element, respectively from the left side in the order of the alignment at intervals corresponding to the gear ratio (the number of teeth of the ring gear/the number of teeth of the sun gear) in the alignment chart, the seventh element corresponds to the sun gear Sa, the eighth element corresponds to the carrier Ca, and the ninth element corresponds to the ring gear Ra. The ratio between the interval between the sun gear Sa and the carrier Ca and the interval between the carrier Ca and the ring gear Ra is set to h:1 when the gear ratio of the first planetary gear mechanism PG1 is h.

The second planetary gear mechanism PG2 is also configured of a so-called single pinion-type planetary gear mechanism that includes a sun gear Sb, a ring gear Rb, and a carrier Cb that axially supports a pinion Pb that is meshed with the sun gear Sb and the ring gear Rb such that the pinion Pb freely rotates and revolves.

Referring to the alignment chart of the second planetary gear mechanism PG2 illustrated in the fourth level (the bottom level) from the top in FIG. 3, three elements Sb, Cb, and Rb of the second planetary gear mechanism PG2 are assumed to be a tenth element, an eleventh element, and a twelfth element, respectively from the left side in the order of alignment at intervals corresponding to the gear ratio in the alignment chart, the tenth element corresponds to the ring gear Rb, the eleventh element corresponds to the carrier Cb, and the twelfth element corresponds to the sun gear Sb. The ratio between the interval between the sun gear Sb and the ring gear Rb and the interval between the carrier Cb and the ring gear Rb is set to i:1 when the gear ratio of the second planetary gear mechanism PG2 is i.

The third planetary gear mechanism PG3 is configured of a so-called single pinion-type planetary gear mechanism that includes a sun gear Sc, a ring gear Rc, and a carrier Cc that axially supports a pinion Pc that is meshed with the sun gear Sc and the ring gear Rc such that the pinion Pc freely rotates and revolves.

Referring to the alignment chart (a chart capable of representing ratios of relative rotation speeds of the three elements, namely the sun gear, the carrier, and the ring gear, with straight lines (speed lines)) of the third planetary gear mechanism PG3 illustrated in the second level from the top in FIG. 3, three elements Sc, Cc, and Rc of the third planetary gear mechanism PG3 are assumed to be a first element, a second element, and a third element, respectively from the left side in the order of alignment at intervals corresponding to the gear ratio in the alignment chart, the first element corresponds to the sun gear Sc, the second element corresponds to the carrier Cc, and the third element corresponds to the ring gear Rc.

Here, the ratio between the interval between the sun gear Sc and the carrier Cc and the interval between the carrier Cc and the ring gear Rc is set to j:1 when the gear ratio of the third planetary gear mechanism PG3 is j. Note that the lower lateral line and the upper lateral line (the lines that overlap the 4th and 6th lines) represent that the rotation speeds are "0" and "1" (the same rotation speed as the input shaft 11), respectively, in the alignment chart.

The fourth planetary gear mechanism PG4 is also configured of a so-called single pinion-type planetary gear mechanism that includes a sun gear Sd, a ring gear Rd, and a carrier Cd that axially supports a pinion Pd that is meshed with the sun gear Sd and the ring gear Rd such that the pinion Pd freely rotates and revolves.

Referring to the alignment chart of the fourth planetary gear mechanism PG4 illustrated in the first level from the top (the top level) in FIG. 3, three elements Sd, Cd, and Rd of the fourth planetary gear mechanism PG4 are assumed to be a fourth element, a fifth element, and a sixth element, respectively from the left side in the order of alignment at intervals corresponding to the gear ratio in the alignment chart, the fourth element corresponds to the ring gear Rd, the fifth element corresponds to the carrier Cd, and the sixth element corresponds to the sun gear Sd. The ratio between the interval between the sun gear Sd and the carrier Cd and the interval between the carrier Cd and the ring gear Rd is set to k:1 when the gear ratio of the fourth planetary gear mechanism PG4 is k.

The sun gear Sc (first element) of the third planetary gear mechanism PG3 is coupled to the input shaft 11. Also, the ring gear Rb (tenth element) of the second planetary gear mechanism PG2 is coupled to the output member 13 that is configured of an output gear.

In addition, the carrier Cc (second element) of the third planetary gear mechanism PG3, the carrier Cd (fifth element) of the fourth planetary gear mechanism PG4, and the ring gear Ra (ninth element) of the first planetary gear mechanism PG1 are coupled to each other, thereby forming a first coupled member Cc-Cd-Ra. Also, the ring gear Rc (third element) of the third planetary gear mechanism PG3 and the sun gear Sb (twelfth element) of the second planetary gear mechanism PG2 are coupled to each other, thereby forming a second coupled member Rc-Sb. In addition, the carrier Ca (eighth element) of the first planetary gear mechanism PG1 and the carrier Cb (eleventh element) of the second planetary gear mechanism PG2 are coupled to each other, thereby forming a third coupled member Ca-Cb.

In addition, the multilevel transmission according to the embodiment includes three first to third clutches C1 to C3, three first to third brakes B1 to B3, and seven engagement mechanisms that are configured of one two-way clutch F1.

The first clutch C1 is a wet-type multi-disk clutch of a hydraulically activated type and is configured to be freely shifted between a coupled state in which the sun gear Sc (first element) of the third planetary gear mechanism PG3 and the third coupled member Ca-C3 are coupled and an opened state in which the coupling is disconnected.

The third clutch C3 is a wet-type multi-disk clutch of a hydraulically activated type and is configured to be freely shifted between a coupled state in which the sun gear Sc (first element) of the third planetary gear mechanism PG3 and the ring gear Rd (fourth element) of the fourth planetary gear mechanism PG4 are coupled and an opened state in which the coupling is disconnected.

The second clutch C2 is a wet-type multi-disk clutch of a hydraulically activated type and is configured to be freely shifted between a coupled state in which the sun gear Sd (sixth element) of the fourth planetary gear mechanism PG4 and the second coupled member Rc-Sb are coupled and an opened state in which the coupling is disconnected.

The two-way clutch F1 also has a function as a fourth brake B4, allows forward rotation of the third coupled member Ca-Cb (the rotation in the rotation direction of the input shaft 11 and/or the rotation in the direction that is the same as the rotation direction of the output member 13 at the time of forward traveling of the vehicle), and is configured to be freely shifted between a reverse rotation inhibited state in which reverse rotation (in the rotation direction opposite to the forward rotation) and a secured state in which the third coupled member Ca-Cb is secured to the transmission case 10.

The two-way clutch F1 is brought into an opened state by being allowed to rotate in the forward rotation direction in a case in which force that promotes rotation in the forward rotation direction is applied to the third coupled member Ca-Cb in the reverse rotation inhibited state, and is brought into a secured state in which the two-way clutch F1 is secured to the transmission case 10 by being inhibited to rotate in a case in which force that promotes rotation in the reverse rotation direction is applied thereto.

The first brake B1 is a wet-type multi-disk brake of a hydraulically actuated type and is configured to be freely shifted between a secured state in which the sun gear Sa (seventh element) of the first planetary gear mechanism PG1 is secured to the transmission case 10 and an opened state in which the securing is released.

The second brake B2 is a wet-type multi-disk brake of a hydraulically actuated type and is configured to be freely shifted between a secured state in which the sun gear Sd (sixth element) of the fourth planetary gear mechanism PG4 is secured to the transmission case 10 and an opened state in which the securing is released. The third brake B3 is a wet-type multi-disk brake of a hydraulically activated type and is configured to be freely shifted between a secured state in which the ring gear Rd (fourth element) of the fourth planetary gear mechanism PG4 is secured to the transmission case 10 and an opened state in which the securing is released.

The state of the respective clutches C1 to C3, the respective brakes B1 to B3, and the two-way clutch F1 is shifted by the gear change control device ECU that is configured of a transmission control unit (TCU) illustrated in FIG. 1 on the basis of vehicle information such as a travel speed of the vehicle that is transmitted from a merging control unit or the like, which is not illustrated in the drawing.

The gear change control device ECU is configured of an electronic unit that includes a CPU, a memory, and the like which are not illustrated in the drawing, can receive predetermined vehicle information such as a travel speed and accelerator opening of the vehicle V, a rotation speed and an output torque of the engine E, and operation information of the shift lever, and controls the multilevel transmission 3 (gear change mechanism) by executing control programs held in a storage device such as a memory using the CPU.

The speed lines represented by broken lines in FIG. 3 represent that the respective elements of other planetary gear mechanism rotate (idle spinning) by following the planetary gear mechanisms that deliver power among the four planetary gear mechanisms PG1 to PG4.

FIG. 4 is a diagram comprehensively illustrating states of the clutches C1 to C3, the brakes B1 to B3, and the two-way clutch F1 in the respective gear ranges, "0" in the sequences of the three first to third clutches C1 to C3 and the three first to three brakes B1 to B3 indicates the coupled state or the secured state, and the blank indicates the opened state. Also, "R" in the sequence of the two-way clutch F1 indicates the reverse rotation inhibited state, and "L" indicates the secured state.

Also, underlined "R" and "L" represent that the rotation speed of the third coupled member Ca-Cb becomes "0" due to the action of the two-way clutch F1. In addition, "R/L" represents that an ordinary state is the reverse rotation inhibited state "R" while the state is shifted to the secured state "L" in a case in which the engine brake is caused to work.

In addition, FIG. 4 also illustrates the gear ratio (the rotation speed of the input shaft 11/the rotation speed of the output member 13) in each gear range and a common ratio (the ratio of gear ratios between the respective gear ranges; a value obtained by dividing the gear ratio in a predetermined gear range by a gear ratio in a gear range on the side of a one-level higher speed than the predetermined gear range) in a case in which the gear ratio h of the first planetary gear mechanism PG1 is assumed to be 2.681, the gear ratio i of the second planetary gear mechanism PG2 is assumed to be 1.914, and the gear ratio j of the third planetary gear mechanism PG3 is assumed to be 2.734, and the gear ratio k of the fourth planetary gear mechanism PG4 is assumed to be 1.614, and it is possible to understand that the common ratio can be appropriately set according to this illustration.

In the embodiment, the four first to fourth planetary gear mechanism PG1 to PG4, the respective clutches C1 to C3, the respective brakes B1 to B3, and the two-way clutch F1 correspond to the gear change unit.

Figure 5:
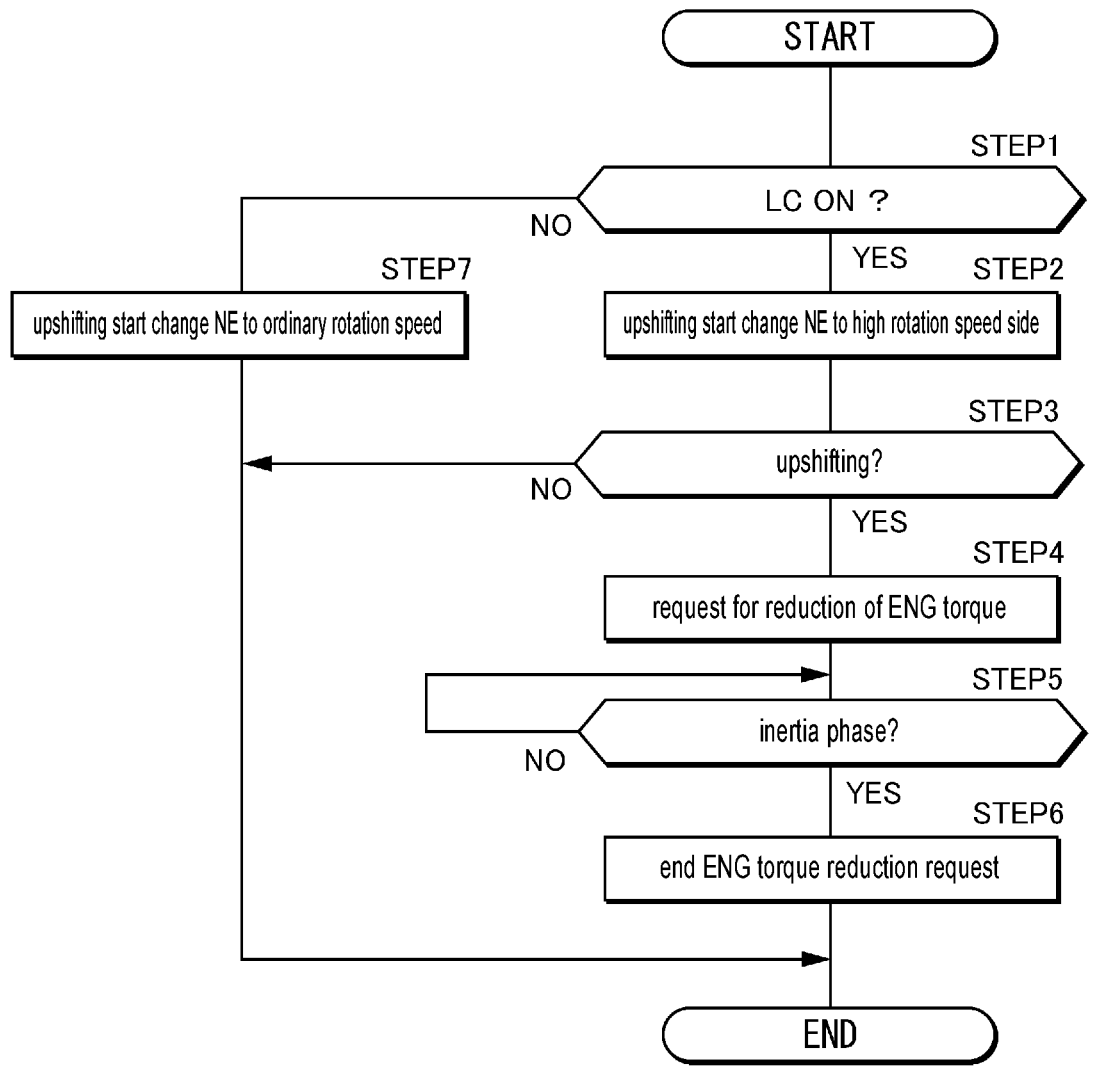
FIG. 5 is a flowchart illustrating operations of the gear change control device and a gear change control method.
Figure 6:
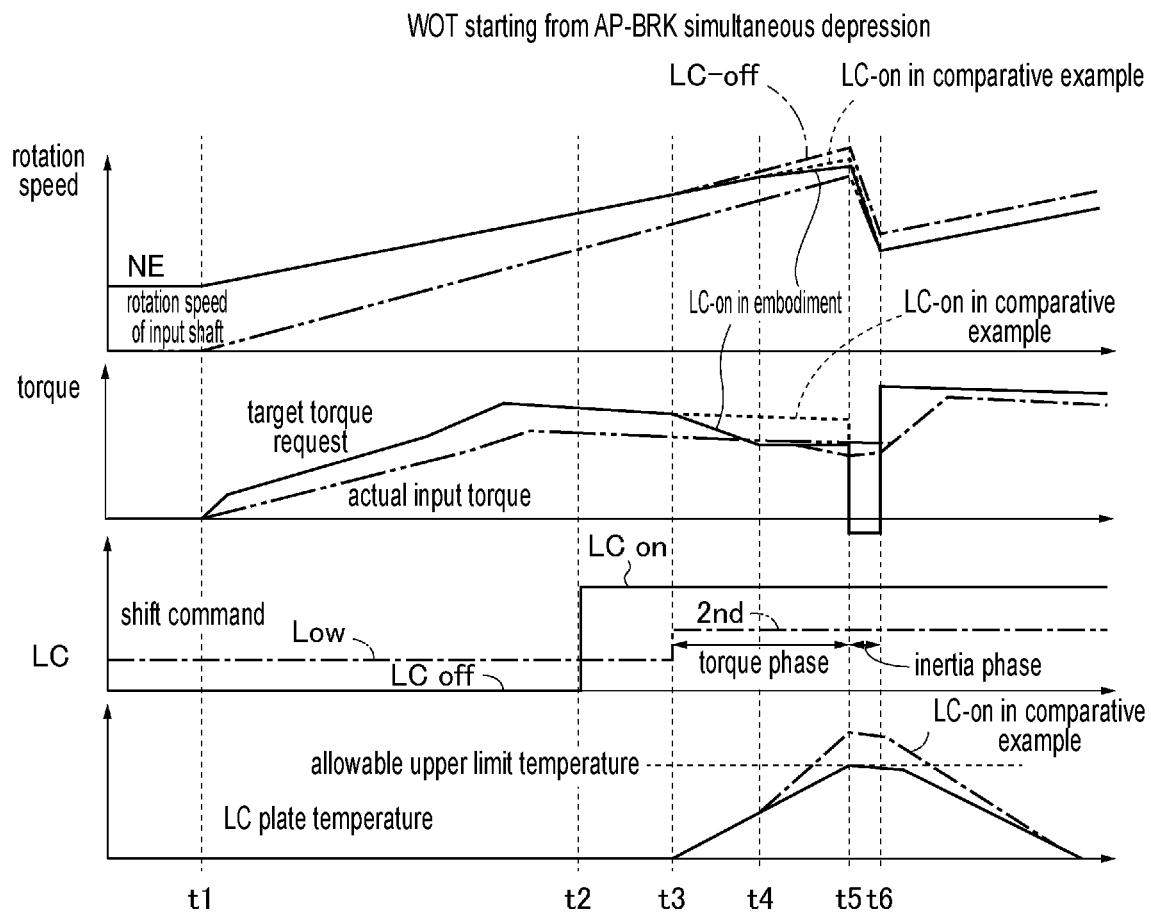
FIG. 6 is a timing chart illustrating a case in which fully open acceleration is performed using the gear change control device according to the embodiment.

FIG. 5 is a flowchart illustrating operations of the gear change control device ECU according to the embodiment. The gear change control device ECU repeatedly executes the processing in FIG. 5 at a predetermined control cycle (10 ms, for example). In the embodiment, the gear change control device ECU also functions as the target torque control device according to the disclosure. FIG. 6 is a timing chart illustrating an example of operations of the gear change control device ECU when the vehicle that is being parked performs fully opened accelerated starting by releasing only the brake pedal (BRK) from a state in which both the accelerator pedal (AP) and the brake pedal are depressed. The time t1 in FIG. 6 represents a timing when the brake pedal is released and the vehicle starts in a first gear range.

In FIG. 6, the horizontal axis represents a time axis, and the vertical axis represents rotation frequencies of the engine E and the input shaft 11, a torque, a shift command signal and a lockup clutch command signal, and a plate temperature of the lockup clutch 2a, respectively. WOT means wide-open throttle, which means a state of fully opening the throttle. The dotted line in the level for the rotation speed in FIG. 6 represents a case in which the lockup clutch is fastened in a comparative example and represents a rotation speed of the motor in a case in which the target torque reduction control is not executed. The one-dotted chain line in the level for the rotation speed in FIG. 6 represents a rotation speed of the motor in a case in which the lockup clutch is not fastened. The dotted line in the level for the torque in FIG. 6 represents a case in which the lockup clutch is fastened in a comparative example and represents a target torque requested value in a case in which the target torque reduction control is not executed. The one-dotted chain line in the level for the plate temperature of the lockup clutch in the bottom level in FIG. 6 represents a case in which the lockup clutch is fastened in a comparative example and represents a plate temperature in a case in which the target torque reduction control is not executed. Also, the plate temperature of the lockup clutch 2a is estimated by the gear change control device ECU depending on a difference between the rotation speed on an IN side and the rotation speed on an OUT side (hereinafter, referred to as differential rotation) in a power transmission path of the lockup clutch 2a, a temperature of a lubricant oil, which of the fastened state or a released state the lockup clutch 2a is in, and the like.

Referring to FIGS. 5 and 6, the gear change control device ECU checks whether or not the lockup clutch 2a is in the fastened state (LC on) in STEP 1 first. The allowable temperature of the lockup clutch 2a is appropriately set in accordance with the capacity of the lockup clutch 2a, the allowable temperature of the lubricant oil of the multilevel transmission, and the like.

Figure 7:
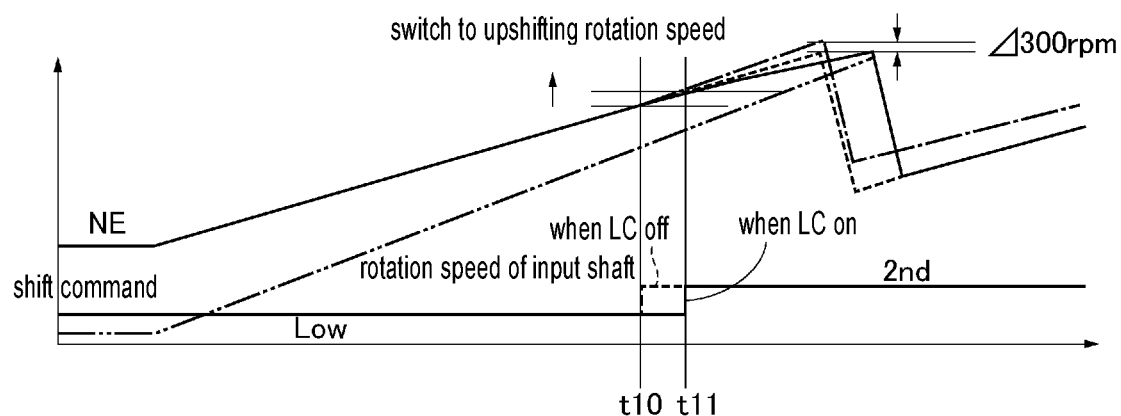
FIG. 7 is a timing chart illustrating a maximum rotation speed in a case in which a threshold value of a rotation speed for upshifting is changed to the side of a high rotation speed according to the embodiment.

In a case in which the lockup clutch 2a is fastened (time t2 in FIG. 6), the processing proceeds to STEP 2, and the threshold value of the rotation speed of the engine E (Number of rotations of the engine, NE) for shifting from the first gear range to the second gear range is shifted to the side of the high rotation speed. In this manner, although the upshifting to the second gear range is performed at the time t10 in the case in which the lockup clutch 2a is not fastened (LC off) as illustrated in FIG. 7, the upshifting to the second gear range is performed at the time t11 after the rotation speed of the engine E increases rather than the time t10 in the case in which the lockup clutch 2a is fastened. The processing in STEP 2 corresponds to the threshold value changing control in the embodiment.

The processing proceeds to STEP 3, and whether or not an upshift request has been issued is checked. In a case in which the upshift request has not been issued, the processing performed this time is ended as it is.

In a case in which the upshift request has been issued in Step 3 (time t3 in FIG. 6), the processing proceeds to STEP 4, and an LC (lockup clutch) low target torque request for reducing the target torque of the motor is issued in a torque phase that is a fastened state of both the clutch in the first gear range and the clutch in the second gear range during upshifting such that the plate temperature of the lockup clutch 2a does not exceed the predetermined allowable temperature. In a case in which a target torque request other than the LC low target torque request has been issued, the gear change control device ECU provides the lower target torque request as a target torque request on the side of the transmission to the motor. Note that it is desirable to perform processing such that impact due to sudden change in torque is alleviated by performing gradual subtraction processing from the current target torque to the LC low target torque in order to prevent the target torque from suddenly decreasing for the LC low target torque request. Also, the LC low target torque is appropriately set in accordance with the gear change mode, the current target torque, and the number of rotations of the input shaft of the multilevel transmission.

Then, in STEP 5, whether or not the phase has been shifted to the inertia phase that is a state in which the clutch in the first gear range is released from the torque phase during the gear change, the clutch in the second gear range is fastened, and the rotation speed of the motor has exceeded the rotation speed corresponding to the second gear range is checked. In a case in which the phase has not been shifted to the inertia phase, the processing in STEP 5 is repeated. If the phase has been shifted in STEP 5 (time t5 in FIG. 6), the processing proceeds to STEP 6, the LC low target torque request executed in STEP 4 is caused to end, and the processing performed this time is ended. Note that the target torque may be reduced greatly such that the rotation speed of the motor is quickly reduced to the rotation speed corresponding to the second gear range in the inertia phase in order to quickly complete the gear change. In this manner, it is possible to quickly reduce the rotation speed of the engine E to the rotation speed corresponding to the gear range after the upshifting (the rotation speed in the second gear range in the case of the upshifting from the first gear rage to the second gear range) in the inertia phase by performing control such that the target torque reduction control in STEP 4 is executed in the torque phase during the upshifting gear change and is not executed in the inertia phase.

In a case in which the lockup clutch 2a is in the released state in STEP 1, the processing is branched to STEP 7. In a case in which the threshold value of the rotation speed of the motor that is to be shifted from the first gear range to the second gear range has been shifted to the side of the high rotation speed, the threshold value of the rotation speed of the motor that is to be shifted from the first gear range to the second gear range is returned to the ordinary threshold value of the rotation speed, and the processing performed this time is ended.

According to the control device of the embodiment, reduction of the target torque of the motor is requested in a case in which upshifting is requested when the lockup clutch 2a is in the fastened state. In this manner, it is possible to prevent the lockup clutch 2a from generating heat over the allowable temperature due to an excessively high target torque of the motor even if the lockup clutch 2a is brought into the fastened state. Also, it is possible to cause the plate temperature of the lockup clutch 2a to fall within the allowable temperature without shifting the lockup clutch 2a to the released state and thereby to prevent acceleration performance from deteriorating in a case in which fully opened accelerated starting is performed, for example.

Also, since the reduction of the requested torque is performed during the gear change during which the torque changes, it is possible to reduce an uncomfortable feeling due to the change in torque that is given to the driver with the decrease in requested torque.

Also, the target torque reduction control is executed in a case in which it is assumed that the lockup clutch 2a exceeds the allowable temperature when the lockup clutch 2a is fastened (STEP 1 in FIG. 5) in the embodiment. In this manner, since it is possible to execute the target torque reduction control by determining whether or not the lockup clutch 2a exceeds the allowable temperature, it is possible to further improve acceleration performance as compared with a case in which the target torque reduction control is executed in the same way when the lockup clutch 2a is fastened (the case in which whether or not the allowable temperature is exceeded is not employed as a determination condition in STEP 1 in FIG. 5).

Figure 8:
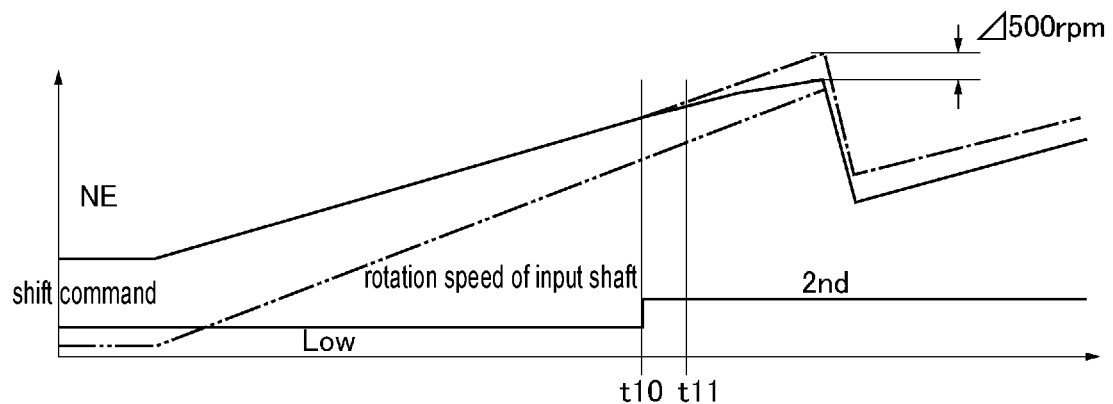
FIG. 8 is a timing chart illustrating the maximum rotation speed in a case in which the threshold value of the rotation speed for upshifting is not changed according to a comparative example of FIG. 7.

Also, it has been discovered that the maximum rotation speed of the engine E in a region until the upshifting is completed greatly decreases in a case in which the threshold value of the rotation speed of the engine E at the time of the upshifting in STEP 2 in FIG. 5 is not changed as compared with a case in which the lockup clutch 2a is not fastened, as illustrated as a comparative example in FIG. 8.

Therefore, in the case in which the lockup clutch 2a is in the fastened state, the threshold value of the rotation speed of the engine E at the time of upshifting is shifted to the side of the high rotation speed as described in STEP 2 in FIG. 5 according to the control device in the embodiment as illustrated in FIG. 7 (as a result, the timing at which the upshifting is started is shifted from the time t10 to the time t11 in FIG. 7). In this manner, it is possible to appropriately maintain the maximum rotation speed during the upshifting even if the target torque reduction request is provided to the motor in STEP 4 in FIG. 5 and to curb a significant decrease in the maximum rotation speed of the engine E in the region until the upshifting is completed as compared with the case in which the upshifting to the second gear range is performed in a state in which the lockup clutch 2a is released.

Note that the embodiment has been described on the assumption that the rotation speed of the engine E is determined as a threshold value that is a condition of the upshifting timing in STEP 2 in FIG. 5. However, according to another embodiment of the gear change control device in the disclosure, a rotation speed of the input shaft 11 of the multilevel transmission 3 may be determined as a threshold value that is a condition of the upshifting timing. At this time, the rotation speed of the input shaft 11 may be corrected to the side of the lower rotation speed on the basis of the acceleration of the vehicle in a case in which the increase rate of the rotation speed of the input shaft 11 is higher than a predetermined value for some reasons such as a low friction road surface or a small loading weight (for example, one occupant). In this manner, it is possible to perform the upshifting at an appropriate timing.

Figure 9:
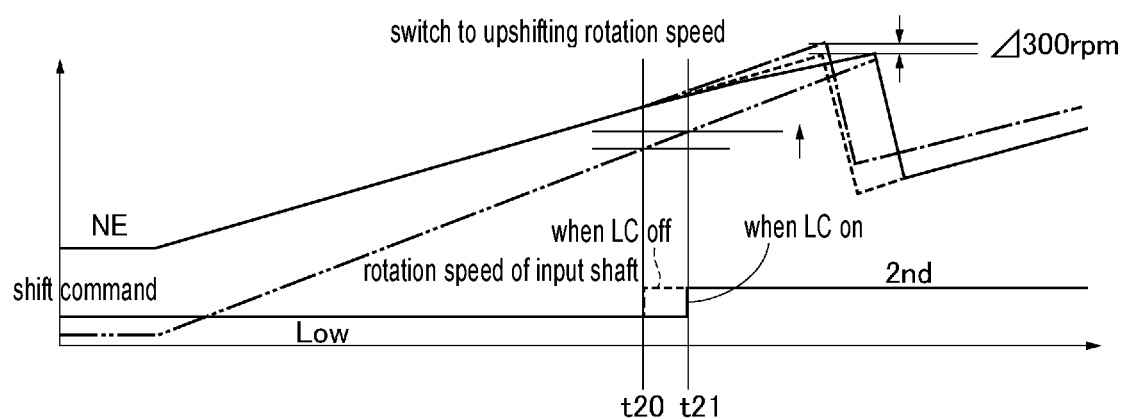
FIG. 9 is a timing chart illustrating the maximum rotation speed in a case in which a threshold value of a rotation speed for upshifting is changed to the side of a high rotation speed according to another embodiment.

In another example described above, the threshold value of the rotation speed of the input shaft 11 that is to be shifted from the first gear range to the second gear range is shifted to the side of the high rotation speed in a case in which the lockup clutch 2a is fastened in the state corresponding to STEP 2 in FIG. 5. In this manner, the ordinary rotation speed of the input shaft 11 is regarded as a threshold value, upshifting to the second gear range is performed at the time t20 in a case in which the lockup clutch 2a is not fastened, and the upshifting to the second gear range is performed at the time 't21 at which the threshold value on the side of the high rotation speed is reached after the rotation speed of the input shaft 11 has increased as compared with the ordinary rotation speed at the time t20 in a case in which the lockup clutch 2a is fastened, as illustrated in FIG. 9.

The processing corresponding to STEP 2 in another embodiment described above also corresponds to the threshold value changing control according to the disclosure. Also, control may be performed such that threshold values are set for both the rotation speed of the input shaft and the rotation speed of the engine E as shifting conditions for the threshold value changing control, and either the rotation speed of the engine E or the rotation speed of the input shaft 11 that has reached the threshold value earlier may be used as a reference for shifting.

In addition, the aforementioned embodiment has been described on the assumption that the lockup clutch 2a is not completely fastened and in a state in which there is a difference between the rotation speed of the lockup clutch 2a on the side of the crankshaft of the engine E and the rotation speed on the side of the input shaft 11 (hereinafter, referred to as differential rotation), the rotation speed of the engine E becomes the same as the rotation speed of the input shaft 11, and no substantial difference occurs depending on which of the rotation speed of the engine E and the rotation speed of the input shaft is to be used as a reference, in a case in which the lockup clutch 2a is completely fastened, and the rotation speeds of the lockup clutch 2a on the side of the crankshaft is completely synchronized with the rotation speed on the side of the input shaft 11 and there is no differential rotation.

Although the embodiments of the disclosure have been described above, various design modifications can be made without departing from the gist of the disclosure.

Also, although the embodiments have been described using the multilevel transmission configured of the planetary gear mechanisms, the disclosure is not limited to the transmission of the planetary gear mechanisms as long as the multilevel transmission includes the torque converter and the lockup clutch, and the disclosure may be applied to other multilevel transmissions.

In addition, although the embodiments have been described by exemplifying the upshifting at the time of fully opened acceleration from the first gear range to the second gear range, the upshifting in the disclosure is not limited thereto, and the disclosure can be similarly applied to upshifting from the second gear range to the third gear range or from the third gear range to the fourth gear range, for example.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gear change control device that controls a multilevel transmission having an input shaft, a torque converter, and a lockup clutch and requests a target torque of a motor that outputs a torque to the multilevel transmission, wherein the lockup clutch is configured to be switchable between a released state and a fastened state, and wherein the released state is a state in which an output torque of the motor is delivered to the multilevel transmission via the torque converter and the fastened state is a state in which the output torque of the motor is delivered directly to the multilevel transmission without the torque converter interposed therebetween, and in a case in which the lockup clutch is in the fastened state, target torque reduction control is executed for providing a request to the motor for reducing the target torque of the motor such that the output torque of the motor becomes an output torque at which a heat generation temperature of the lockup clutch does not exceed an allowable temperature, during upshifting gear change, and if the lockup clutch is fastened, threshold value changing control is executed for changing a threshold value of a rotation speed of the motor or a threshold value of a rotation speed of the input shaft of the multilevel transmission when a gear range is shifted to a higher gear range during the upshifting gear change to a side of higher rotation speed.

2. The gear change control device according to claim 1, wherein the target torque reduction control is executed in a torque phase during the upshifting gear change and is not executed in an inertia phase.

3. The gear change control device according to claim 1, wherein the target torque reduction control is executed in a case in which it is assumed that the lockup clutch exceeds the allowable temperature when the lockup clutch is fastened.

4. The gear change control device according to claim 2, wherein the target torque reduction control is executed in a case in which it is assumed that the lockup clutch exceeds the allowable temperature when the lockup clutch is fastened.

5. A gear change control method of controlling a multilevel transmission that has an input shaft, a torque converter, and a lockup clutch and requesting a target torque of a motor that outputs a torque to the multilevel transmission, wherein the lockup clutch is configured to switchable between a released state and a fastened state, and wherein the released state is a state in which an output torque of the motor is delivered to the multilevel transmission via the torque converter and the fastened state is a state in which the output torque of the motor is delivered directly to the multilevel transmission without the torque converter interposed therebetween, the gear change control method comprising, in a case in which the lockup clutch is in the fastened state:

executing target torque reduction control for providing a request to the motor for reducing the target torque of the motor such that the output torque of the motor becomes an output torque at which a heat generation temperature of the lockup clutch does not exceed an allowable temperature, during upshifting gear change; and executing, if the lockup clutch is fastened, threshold value changing control for changing a threshold value of a rotation speed of the motor or a threshold value of a rotation speed of the input shaft of the multilevel transmission when a gear range is shifted to a higher gear range during the upshifting gear change to a side of higher rotation speed.

* * * * *